United States Patent
Kim

(10) Patent No.: US 9,744,464 B2
(45) Date of Patent: Aug. 29, 2017

(54) GAME ITEM MANAGEMENT

(71) Applicant: Empire Technology Development LLC, Wilmington, DE (US)

(72) Inventor: Seungil Kim, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 352 days.

(21) Appl. No.: 14/377,612

(22) PCT Filed: Oct. 25, 2013

(86) PCT No.: PCT/US2013/066907
§ 371 (c)(1),
(2) Date: Aug. 8, 2014

(87) PCT Pub. No.: WO2015/060873
PCT Pub. Date: Apr. 30, 2015

(65) Prior Publication Data
US 2016/0243446 A1 Aug. 25, 2016

(51) Int. Cl.
*A63F 9/24* (2006.01)
*A63F 13/69* (2014.01)
(Continued)

(52) U.S. Cl.
CPC .............. *A63F 13/69* (2014.09); *A63F 13/30* (2014.09); *A63F 13/35* (2014.09); *A63F 13/73* (2014.09);
(Continued)

(58) Field of Classification Search
None
See application file for complete search history.

(56) References Cited

U.S. PATENT DOCUMENTS

| 8,376,859 B2 | 2/2013 | Kim | |
| 2006/0154724 A1* | 7/2006 | Okuniewicz | G07F 17/3239 463/29 |

(Continued)

FOREIGN PATENT DOCUMENTS

WO   2013109790 A1   7/2013

OTHER PUBLICATIONS

"Aion and Lineage II Enjoy Massive Weekly Update," mmohuts, accessed at http://web.archive.org/web/20130910081420/http://mmohuts.com/news/aion-and-lineage-ii-enjoy-massive-weekly-update, accessed on Jul. 18, 2014, pp. 1-3.

(Continued)

Primary Examiner — Jason Yen
(74) Attorney, Agent, or Firm — Brundidge & Stanger, P.C.

(57) ABSTRACT

Technologies are generally described for a game item management scheme. In some examples, a method performed under control of a game server may include receiving, from a player account, a request to play a game hosted on the game server; determining whether the player account has been dormant based at least in part on an amount of elapsed time between a most recent playing of the game and the receiving; and modifying at least one game item associated with the player account, when the determining indicates that the player account has been dormant.

20 Claims, 9 Drawing Sheets

(51) Int. Cl.
*A63F 13/73* (2014.01)
*A63F 13/75* (2014.01)
*A63F 13/30* (2014.01)
*A63F 13/77* (2014.01)
*A63F 13/35* (2014.01)
*A63F 13/79* (2014.01)

(52) U.S. Cl.
CPC .............. *A63F 13/75* (2014.09); *A63F 13/77* (2014.09); *A63F 13/79* (2014.09)

(56) References Cited

U.S. PATENT DOCUMENTS

| | | | |
|---|---|---|---|
| 2010/0216541 A1* | 8/2010 | Boyd | G07F 17/32 463/20 |
| 2010/0240443 A1 | 9/2010 | Baerlocher et al. | |
| 2010/0295796 A1 | 11/2010 | Roberts et al. | |
| 2011/0111861 A1* | 5/2011 | St. Martin | G07F 17/32 463/42 |
| 2011/0306398 A1* | 12/2011 | Boch | A63F 13/428 3/428 |
| 2012/0115585 A1* | 5/2012 | Goldman | G07F 17/3272 463/25 |
| 2012/0142429 A1* | 6/2012 | Muller | A63F 13/12 463/42 |
| 2012/0315987 A1* | 12/2012 | Walling | A63F 13/10 463/31 |
| 2012/0315993 A1* | 12/2012 | Dumont | G07F 17/3225 463/42 |
| 2013/0053149 A1 | 2/2013 | Rouse et al. | |
| 2013/0059663 A1* | 3/2013 | Kurlancheek | A63F 9/24 463/42 |
| 2013/0079144 A1* | 3/2013 | Ahmed | A63F 13/87 463/42 |

OTHER PUBLICATIONS

"EQ2 Legacy promotion offered to inactive Everquest accts," MMORPG, accessed at http://www.mmorpg.com/gamelist.cfm/game/2/view/forums/post/2205647#2205647, accessed on Jul. 18, 2014, pp. 1-3.

"Supporting Returning Players and ideas for Refer-a-Friend?," accessed at http://web.archive.org/web/20131109201057/http://archive.eq2wire.com/showthread.php?t=522444&page=2, accessed on Jul. 18, 2014, Jelsoft Enterprises Ltd., pp. 17.

International Search Report and Written Opinion for International Application No. PCT/US2013/066907, mailed on Mar. 21, 2014.

* cited by examiner

FIG. 6

| ITEM NO. | MORE THAN 6 MONTHS | MORE THAN 12 MONTHS |
|---|---|---|
| 0001 | PERFORMANCE UPGRADE BY 70 POWER DEGREES | ITEM REPLACEMENT TO ITEM NO. 0075 |
| 0002 | N/A | ITEM REPLACEMENT TO ITEM NO. 0063 |
| 0003 | PERFORMANCE UPGRADE BY 50 POWER DEGREES | PERFORMANCE UPGRADE BY 120 POWER DEGREES |
| 0004 | N/A | N/A |
| ⋮ | ⋮ | ⋮ |

GAME ITEM MANAGEMENT

CROSS-REFERENCE TO RELATED APPLICATION

This application is a U.S. National Stage filing under 35 U.S.C. §371 of International Application No. PCT/US2013/066907, filed on Oct. 25, 2013.

BACKGROUND

A game item is an object within a game world that can be collected by a game player, typically as a reward or an object of achievement. Game items are especially prevalent in role-playing games (RPGs), as they are usually necessary for the completion of quests or to advance through the story. Game items often come in various types, and, in most games in which items are collected, they are sorted by these types. In RPGs, a game item inventory is a common UI feature by which one can view all the items that have been collected thus far. Often, these are sorted by categories, such as "equipment" or "potions."

SUMMARY

In an example, a method performed under control of a game server may include receiving, from a player account, a request to play a game hosted on the game server; determining whether the player account has been dormant based at least in part on an amount of elapsed time between a most recent playing of the game and the receiving; and modifying at least one game item associated with the player account, when the determining indicates that the player account has been dormant.

In another example, a game server may include a play request receiver unit configured to receive, from a player account, a request to play a game hosted on the game server; a dormancy determination unit configured to determine whether the player account has been dormant based at least in part on an amount of elapsed time between a most recent playing of the game and the request to play the game; and a game item modification unit configured to modify at least one game item associated with the player account after the dormancy determination unit determines that the player account has been dormant.

In yet another example, a computer-readable storage medium may store thereon computer-executable instructions that, in response to execution, cause a processor to perform operations, including receiving, from a player account, a request to play a game hosted on a game server; comparing an amount of elapsed time between a most recent playing of the game and the request to play the game with a threshold time period; determining that the player account has been dormant when the amount of elapsed time is longer than the threshold time period; and modifying at least one game item associated with the player account.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 schematically shows an illustrative example of a look-up table for implementing at least one example embodiment of a game item management scheme, arranged in accordance with at least some embodiments described herein;

DETAILED DESCRIPTION

Figure 1:
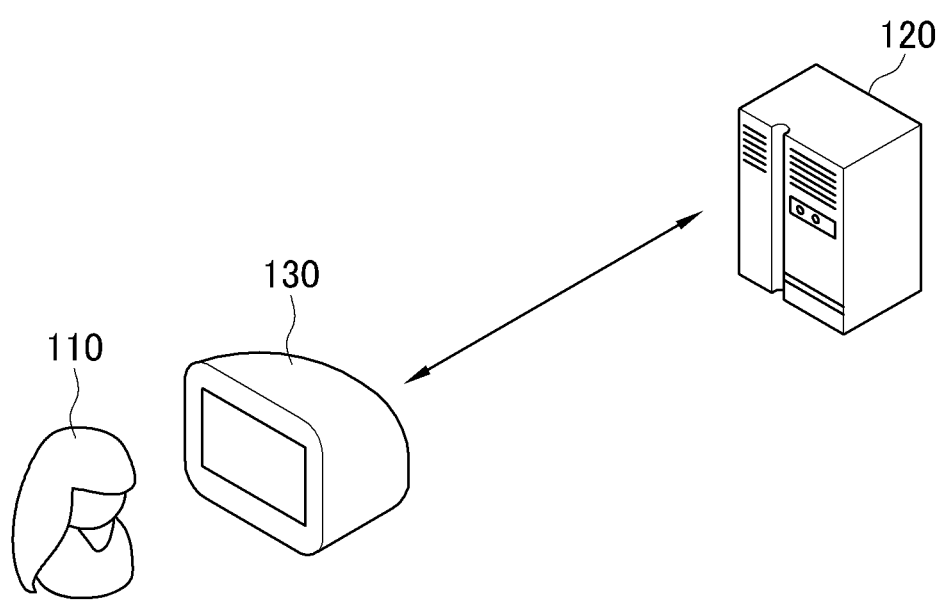
FIG. 1 schematically shows an illustrative example of an environment in which a player plays a game hosted on a game server using his/her electronic device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to game item management. Further, technologies are herein generally described for modifying at least one game item associated with a player account when the player account is dormant.

In some examples, a player of a game hosted on a game server may access his/her player account to play the game after a long time away from the game. The player and/or player account may have one or more game items relating to the game attained from previous play. However, changes may have been made to the game during the player's time away from the game, i.e., dormancy, and the game items from previous iterations of the game may be useless or less helpful with regard to a present iteration of the game. Thus, the player may have difficulties or lose interest if he/she plays the game with such old items. In accordance with multiple embodiments described herein, the game server may modify and/or update the game items attributed to the player who has not played the game for a long period of time so that the player may seamlessly continue playing the game with the modified/updated game items. Thus, a determination of dormancy relative to a player and/or player account may be considered to be a stimulus for at least one game item relative to the player account to be updated.

In some examples, when the player accesses the player account and submits a request to play the game after a long period away from the game, the game server may determine whether the player and/or player account has been dormant. By way of example, but not limitation, the game server may calculate elapsed time from a most recent playing of the game by the player and compare the elapsed time with a threshold time period. If the elapsed time is longer than the threshold time period, the game server may determine that the player and/or player account has been dormant.

In some embodiments, the game server may utilize a date and/or time of day since a most recent patch relating to the game was released when determining a dormancy of the player and/or player account. That is, since a patch such as a service pack, an expansion pack or a balance patch may significantly change an environment of the game, the game server may determine that the player and/or player account has been dormant if the player has not played the game for a threshold time period after the most recent patch was released.

In some examples, when the game server determines that the player and/or player account has been dormant, the game server may select and modify at least one game item from among multiple game items associated with the player account. By way of example, but not limitation, the game server may modify the at least one game item by replacing it with another game item that is relevant to a current iteration of the game. To properly replace the game item with another game item, the game server may consider various factors, for example, including at least one of usage information or transaction information of other players. For example, the player may have used a sword before he/she went dormant because the sword was the most popular offensive item at that time. However, when the player returns from dormancy, other players may use bows rather than swords. Further, some of the other players who previously owned bows may have traded the bows for swords. Then, the game server may replace the sword belonging to the player and/or player account, prior to the player and/or player account's dormancy, with a bow, relevant to a current iteration of the game, based on the usage information and/or the transaction information of the other active players. Alternatively or additionally, the game server may modify the at least one game item by upgrading performance capabilities of the at least one game item. For example, the game server may upgrade the power degrees of the sword owned by the player and/or player account that has been dormant.

In some examples, the game server may consider the length of the player and/or player account's dormancy when modifying the at least one game item. By way of example, but not limitation, the game server may upgrade the effectiveness of the game item, in the context of the game, by a predetermined factor, when the period of dormancy is longer than 6 months and by a predetermined exponentially increased factor when the period of dormancy is longer than 12 months.

FIG. 1 schematically shows an illustrative example of an environment in which a player 110 plays a game hosted on a game server 120 using his/her electronic device 130, arranged in accordance with at least some embodiments described herein.

As depicted, electronic device 130, which may be owned and/or controlled by player 110, may be communicatively coupled to game server 120 over a network such as, for example, the Internet, a wireless network, a cellular network, a wide area network (WAN), a metropolitan area network (MAN), a local area network (LAN), a campus area network (CAN), a virtual private network (VPN), etc. Electronic device 130 may be of any type of electronic device configured to store, retrieve, compute, transmit and/or receive data; and may include, for example, a smartphone, a mobile phone, a personal digital assistant (PDA), a tablet, a hybrid of the aforementioned devices, a personal computer such as a laptop computer or a desktop computer, a television, a gaming console, etc. Game server 120 may be configured to host the game and may be associated with a particular data source configured to store and provide data items regarding the game, for the player account for player 110. Game server 120 may be further configured to host player account of player 110, which may be associated with the game, so that player 110 may access the player account and request to play the game. In some embodiments, game server 120 may include a cloud-based game server which may provide a game service to multiple client devices over a network.

In some embodiments, game server 120 may be configured to determine whether the player account has been dormant when player 110 submits a request to play the game. That is, when game server 120 receives a request to play the game from the player account of player 110, game server 120 may determine whether the player account has been dormant based at least in part on an amount of elapsed time between a most recent playing of the game and the receiving of the request. By way of example, but not limitation, game server 120 may determine that the player account of player 110 has been dormant when the amount of elapsed time is longer than a threshold time period. Alternatively or additionally, game server 120 may determine whether the player account has been dormant based at least in part on an amount of elapsed time between a release of a most recent patch related to the game and the receiving of the request. Thus, a determination of dormancy relative to a player account may be considered to be a stimulus for at least one game item relative to the player account to be updated.

If the player account is determined to have been dormant, in some embodiments, game server 120 may modify at least one game item associated with the player account in preparation for the requested playing of the game. In such cases, game server 120 may be configured to select the at least one game item to be modified from among multiple game items associated with the player account. By way of example, but not limitation, the player account may have, in its game item inventory, a sword and a shield. Game server 120 may select at least one of the sword or the shield based on various factors including, for example, at least one of the amount of elapsed time (i.e., a period of dormancy), usage information of other players, transaction information of other players, or an average growth rate of performance capabilities of the sword. The usage information may include information about usage and/or usage pattern of game items by players that is relevant to a current iteration of the game, and the transaction information may include information about buying, selling, trading or exchanging game items by players of the game. Further, game server 120 may modify the selected sword and/or shield by replacing it with another game item and/or by upgrading performance capabilities of the selected sword and/or shield based at least in part on one or more of the various factors. The process of selecting and modifying will be described more in details with reference to FIGS. 2-6 below.

Figure 2:
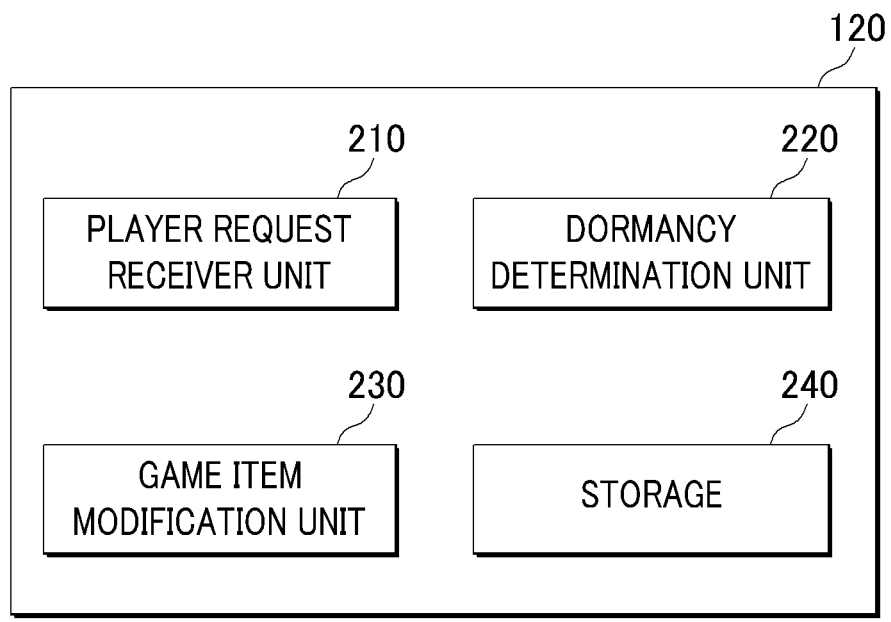
FIG. 2 shows a schematic block diagram illustrating an example architecture of a game server for implementing a game item management scheme, arranged in accordance with at least some embodiments described herein.

FIG. 2 shows a schematic block diagram illustrating an example architecture of game server 120 for implementing a game item management scheme, arranged in accordance with at least some embodiments described herein. Reference may be made to the embodiments depicted and described with reference to FIG. 1.

As depicted, game server 120 may include a player request receiver unit 210, a dormancy determination unit 220, a game item modification unit 230, and a storage 240. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Player request receiver unit 210 may be configured to receive, from a player account of player 110, a request to play a game that is hosted on game server 120. By way of example, but not limitation, player 110 may access the player account, which may be hosted on game server 120, using electronic device 130 and request to play the game. In the examples described with reference to FIG. 2, it is assumed that player 110 requests to play the game after a long time away from the game.

Dormancy determination unit 220 may be configured to determine whether the player account has been dormant based at least in part on an amount of elapsed time between a most recent playing of the game and the request to play the game. In some embodiments, dormancy determination unit 220 may compare the amount of elapsed time with a threshold time period, and if the amount of elapsed time is longer than the threshold time period, dormancy determination unit 220 may determine that the player account has been dormant up to the time the request was received by player request receiver unit 210. The threshold time period may be determined or modified based at least in part on the number of players who have not played the game for a long while and each player's period away from the game. By way of example, but not limitation, if the threshold time period is set to be six months, and if the number of players who have not played the game for more than six months has increased from 30 percent to 50 percent of whole players of the game, a system administrator corresponding to game server 120 may reduce the threshold time period to three months.

Game item modification unit 230 may be configured to select and modify at least one game item to be modified from among one or more game items associated with the player account after dormancy determination unit 220 has determined that the player account has been dormant up to the time the request was received by player request receiver unit 210. In some embodiments, game item modification unit 230 may replace the at least one game item with another game item and/or upgrade performance capabilities of the at least one game item. In such cases, game item modification unit 230 may refer to a look-up table that may be hosted on game server 120. The look-up table may be configured to indicate how to modify multiple game items associated with the game. Examples of the look-up table will be described with reference to FIG. 6 below.

Storage 240 may be configured to store at least some of program modules and data relating the game. The at least some of program modules and data may be provided to electronic device 130 for player 110 to play the game. Further, storage 240 may be configured to store information and/or data regarding the player account of player 110 including, for example, the one or more game items associated with the player account. In some embodiments, storage 240 may store the look-up table.

Figure 3:
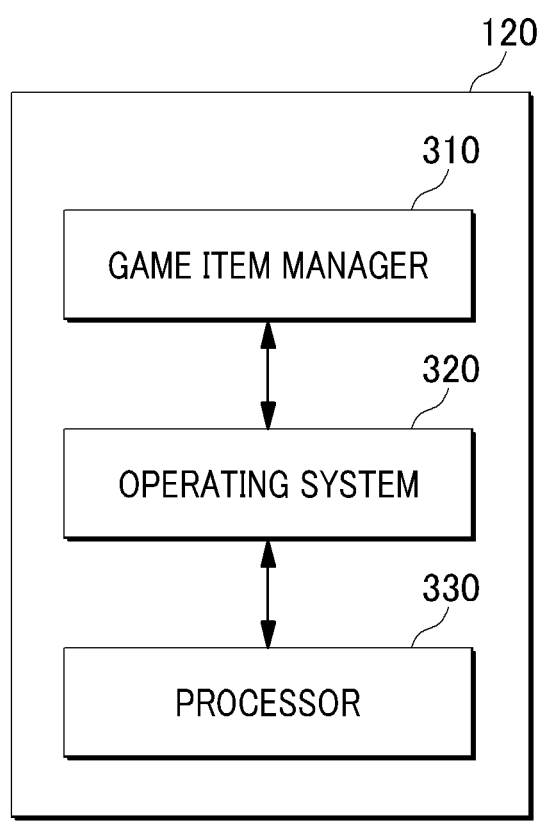
FIG. 3 shows a schematic block diagram illustrating another example architecture of a game server for implementing a game item management scheme, arranged in accordance with at least some embodiments described herein.

FIG. 3 shows a schematic block diagram illustrating another example architecture of game server 120 for implementing a game item management scheme, arranged in accordance with at least some embodiments described herein. Reference may be made to the embodiments depicted and described with reference to FIGS. 1 and 2.

As depicted, game server 120 may include a game item manager 310, an operating system 320 and a processor 330. In some embodiments, game item manager 310 may be a part of an application associated with a game hosted on game server 120. Game item manager 310 may be adapted to operate on operating system 320 such that the game item management scheme, as described herein, may be provided. Operating system 320 may allow game item manager 310 to manipulate processor 330 to implement the game item management scheme as described herein.

In some embodiments, game item manager 310 may be an application program module that may assist, control and/or manage operations, actions and/or functionalities provided by the game, as a part of the game or as a separate program module hosted on game server 120. A system administrator corresponding to game server 120 may access game item manager 310 to set, adjust and/or modify parameters and/or descriptions for implementing the game item management scheme.

Figure 4:
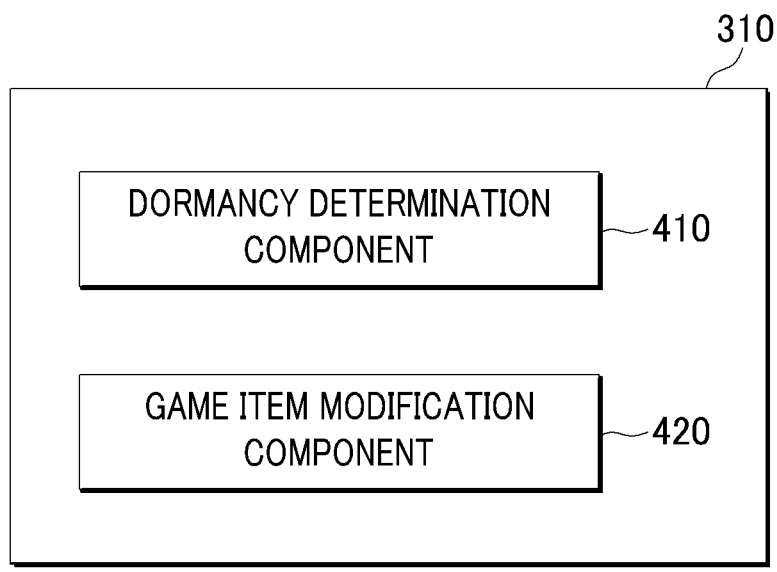
FIG. 4 shows a schematic block diagram illustrating an example architecture of a game item manager for implementing a game item management scheme, arranged in accordance with at least some embodiments described herein.

FIG. 4 shows a schematic block diagram illustrating an example architecture of game item manager 310 for implementing a game item management scheme, arranged in accordance with at least some embodiments described herein. Reference may be made to the embodiments depicted and described with reference to FIGS. 1-3.

As depicted, game item manager 310 may include a dormancy determination component 410 and a game item modification component 420. Dormancy determination component 410 may be adapted to determine whether a player account of a player has been dormant. Further, game item modification unit 420 may be adapted to modify at least one game item associated with the player account after dormancy determination component 410 determines that the player account has been dormant.

Figure 5A:
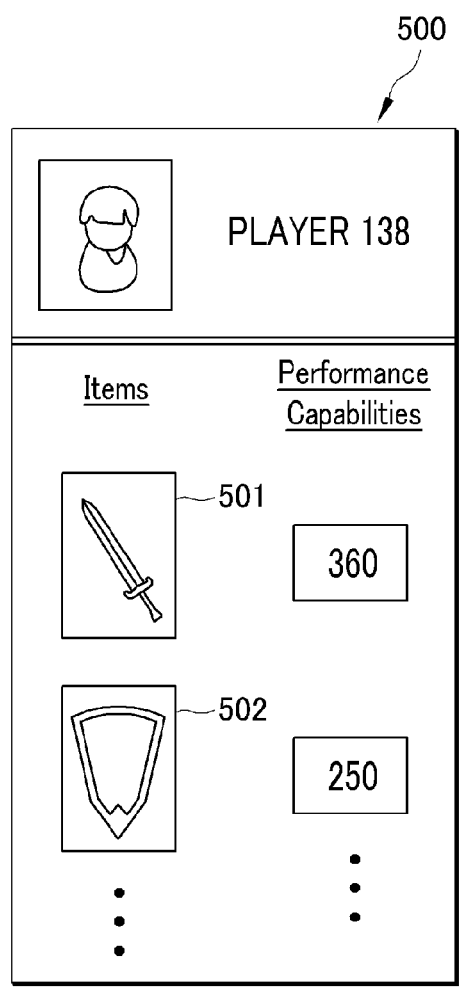
FIGS. 5A and 5B schematically show illustrative examples of screenshots of a game item inventories displayed on an electronic device, arranged in accordance with at least some embodiments described herein.
Figure 5B:
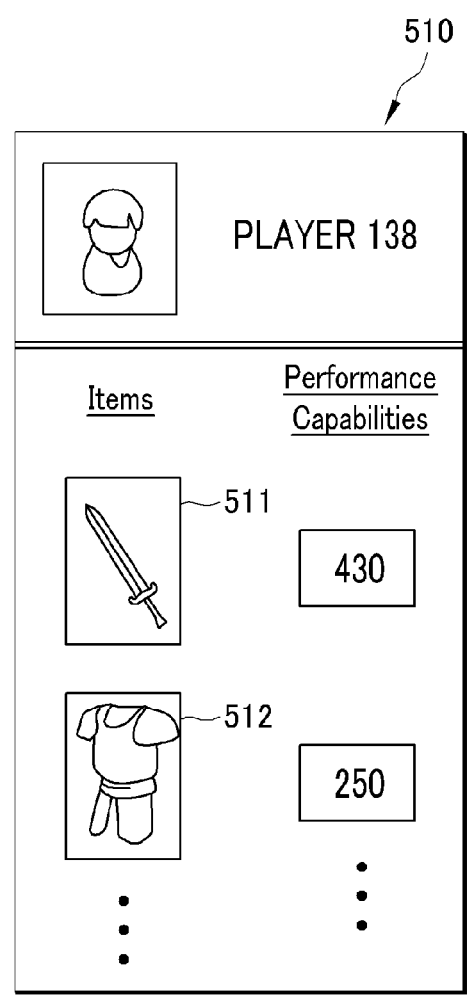

FIGS. 5A and 5B schematically show illustrative examples of screenshots of game item inventories 500 and 510 displayed on an electronic device 130, arranged in accordance with at least some embodiments described herein. Reference may be made to the embodiments depicted and described with reference to FIGS. 1-4.

As depicted in FIGS. 5A and 5B, game item inventories 500 and 510 may be associated with a player account of player 110; game item inventory 500 may include a sword 501 and a shield 502; and game item inventory 510 may include a sword 511 and body armor 512. Further, while performance capabilities of sword 501 in game item inventory 500 may be depicted by description 360, performance capabilities of sword 511 in game item inventory 510 may be depicted by description 430. In some embodiments, game item inventory 500 may show game items that were previously associated with the player account of player 110 before the player account went dormant. When player 110 accesses the player account to play the game after a long while away from the game, using electronic device 130, and when game server 120 has determined that the player account has been dormant (as described in the above examples), game server 120 may modify at least one of the game items previously associated with the player account, and game item inventory 500 may show the modified game items.

In accordance with at least one non-limiting example, game server 120 (e.g., game item modification unit 230 in FIG. 2) may modify sword 501 by upgrading the performance capabilities from those depicted by description 360 to those depicted by description 430 corresponding to sword 511. In such cases, game server 120 may upgrade the performance capabilities based at least in part on an average growth rate of the performance capabilities of other players who owned the same game item during dormancy of the player account.

In accordance with one or more non-limiting examples, game server 120 (e.g., game item modification unit 230 in FIG. 2) may modify shield 502 by replacing it with body armor 512 based at least in part on usage information and/or transaction information of other players. That is, most players may have used shields as a defensive game item before the player account went dormant; however, due to changes in an environment of the game (e.g., a change of a mission for players, introduction of new strategies based on a patch, etc.), players may prefer body armor to shields for an updated iteration of the game, and at least some of the players may have traded their shields for body armor. Such usage information and/or transaction information may become data for determining conditions and circumstances for updating the game items of the player account that was determined to be dormant.

In some embodiments, game server 120 (e.g., game item modification unit 230 in FIG. 2) may refer to a look-up table that is configured to indicate how to modify game items associated with the game. By way of example, but not limitation, a system administrator of game server 120 may prepare and update the look-up table with reference to various factors including at least one of a period of dormancy, usage information of other players, transaction information of other players, or an average growth rate of performance capabilities of game items. Such look-up table may be hosted on game server 120 and/or stored in storage 240 of game server 120.

FIG. 6 schematically shows an illustrative example of a look-up table 600 for implementing at least one example embodiment of a game item management scheme, arranged in accordance with at least some embodiments described herein. Reference may be made to the embodiments depicted and described with reference to FIGS. 1-5.

As depicted, a first column 610 may indicate an item number which identifies each item, a second column 620 may indicate how to modify each game item when a threshold time for dormancy determination is 6 months, and a third column 630 may indicate how to modify each game item when the threshold time for dormancy determination is 12 months. Further, rows 640-670 may indicate how to modify Item Nos. 001-004, respectively, in accordance with each dormancy period.

In accordance with at least one non-limiting example, when game server 120 (e.g., dormancy determination unit 220 in FIG. 2) determines that the player account of player 110 has been dormant for more than 6 months (and less than 12 months), game server 120 (e.g., game item modification unit 230 in FIG. 2) may modify at least one game item associated with the player account with reference to second column 620 of look-up table 600. For instance, if player 110 has the game item corresponding to Item No. 0001 attained from previous play and his/her player account has been dormant for more than 6 months and less than 12 months, game server (e.g., game item modification unit 230 in FIG. 2) may upgrade performance capabilities of the game item of Item No. 0001 by 70 power degrees.

As such, game server 120 may be able to easily modify the game items with reference to look-up table 600. One skilled in the art would appreciate that the items, the dormancy periods and the descriptions for modification illustrated in look-up table 600 are non-limiting example parameters and any other parameters for implementing the modification scheme in accordance with multiple embodiments described herein will be available for look-up table 600.

Figure 7:
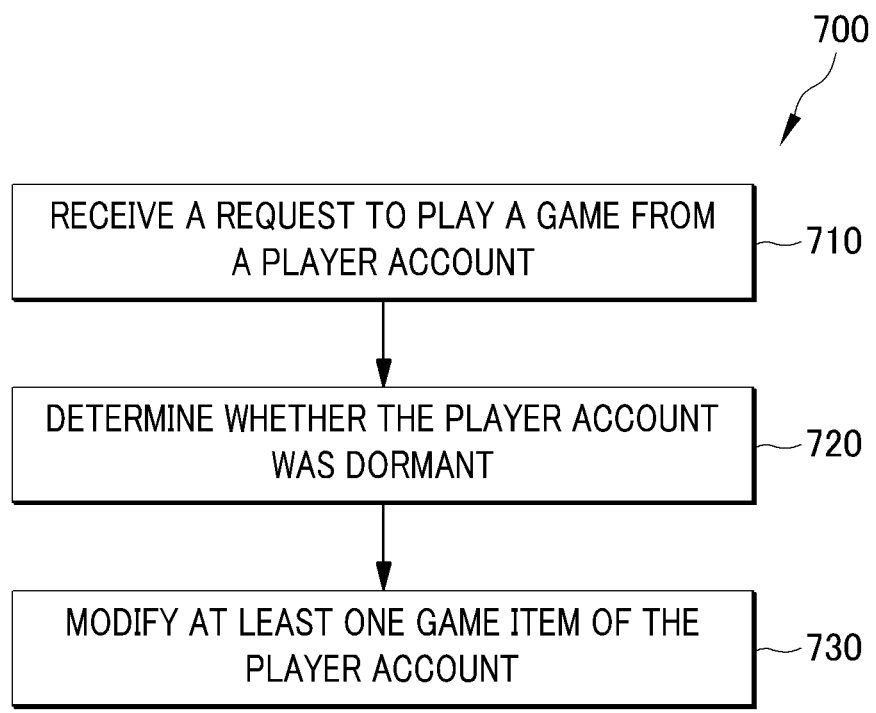
FIG. 7 shows an example flow diagram of a process for implementing a game item management scheme, arranged in accordance with at least some embodiments described herein.

FIG. 7 shows an example flow diagram of a process for implementing a game item management scheme, arranged in accordance with at least some embodiments described herein.

Process 700 may be implemented in a server such as game server 120 including player request receiver unit 210, dormancy determination unit 220, game item modification unit 230, and storage 240. Process 700 may also be implemented by computer programs or program modules that may be adapted to provide a game item management scheme and hosted by game server 120, such as game item manager 310 including dormancy determination component 410 and game item modification component 420. Thus, reference may be made to the embodiments depicted and described with reference to FIGS. 1-6. Process 700 may include one or more operations, actions, or functions as illustrated by one or more blocks 710, 720 and/or 730. Although illustrated as discrete blocks, various blocks may be divided into additional blocks, combined into fewer blocks, or eliminated, depending on the desired implementation. Processing may begin at block 710.

At block 710 (Receive a Request to Play a Game from a Player Account), game server 120 and/or game item manager 310 may receive, from a player account, a request to play a game hosted on game server 120. Processing may continue from block 710 to block 720.

At block 720 (Determine Whether the Player Account has been Dormant), game server 120 and/or game item manager 310 may determine whether the player account has been dormant, at the time the request to play is received, based at least in part on an amount of elapsed time between a most recent playing of the game and the receiving of the request. In some embodiments, game server 120 and/or game item manager 310 may compare the amount of elapsed time with a threshold time period, and if the amount of elapsed time is longer than the threshold time period, game server 120 and/or game item manager 310 may determine that the player account has been dormant. Processing may continue from block 720 to block 730.

At block 730 (Modify at least one Game Item of the Player Account), game server 120 and/or game item manager 310 may modify at least one game item associated with the player account, when it is determined that the player account has been dormant. In some embodiments, game server 120 and/or game item manager 310 may replace the at least one game item with another game item and/or upgrade performance capabilities of the at least one game item.

As such, a player (such as player 110), who accesses the player account to play the game after a long while, may seamlessly continue playing the game with the modified/updated game items.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
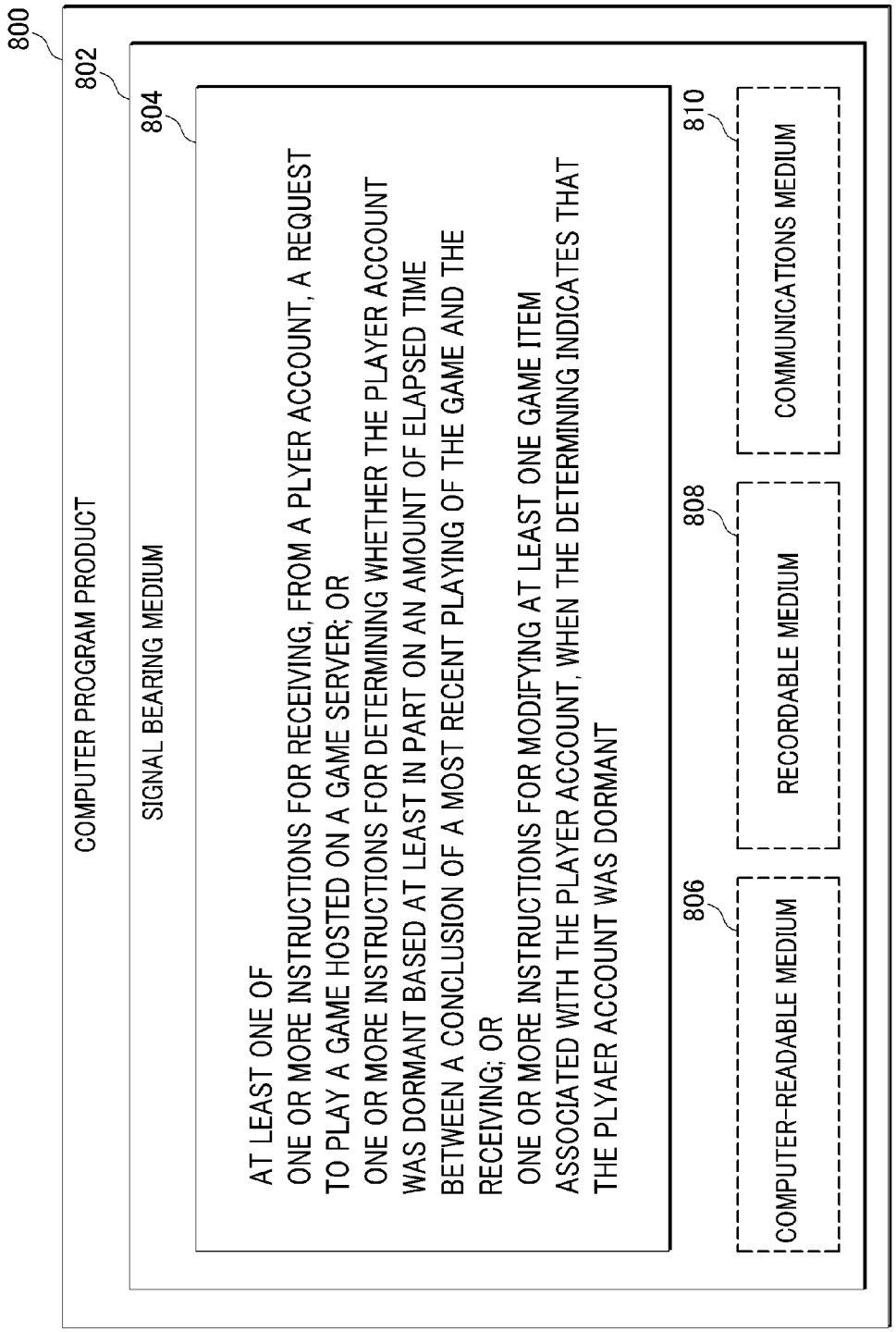
FIG. 8 illustrates an example computer program product that may be utilized to implement a game item management scheme, arranged in accordance with at least some embodiments described herein.

FIG. 8 illustrates an example computer program product 800 that may be utilized to implement a game item management scheme, arranged in accordance with at least some embodiments described herein.

As depicted, computer program product 800 may include a signal bearing medium 802. Signal bearing medium 802 may include one or more instructions 804 that, when executed by, for example, a processor of game server 120 may provide the functionality described above with respect to FIGS. 1-7. By way of example, instructions 804 may include: one or more instructions for receiving, from a player account, a request to play a game hosted on a game server; or one or more instructions for determining whether the player account has been dormant based at least in part on an amount of elapsed time between a most recent playing of the game and the receiving; or one or more instructions for modifying at least one game item associated with the player account, when the determining indicates that the player account has been dormant.

In some implementations, signal bearing medium 802 may encompass a computer-readable medium 806, such as, but not limited to, a hard disk drive (HDD), a compact disk (CD), a digital versatile disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communication link, a wireless communication link, etc.). Thus, for example, computer program product 800 may be conveyed to one or more modules of game server 120 by an RF signal bearing medium 802, where the signal bearing medium 802 is conveyed by a wireless communications medium 810 (e.g., a wireless communications medium conforming with the IEEE 802.11 standard).

Figure 9:
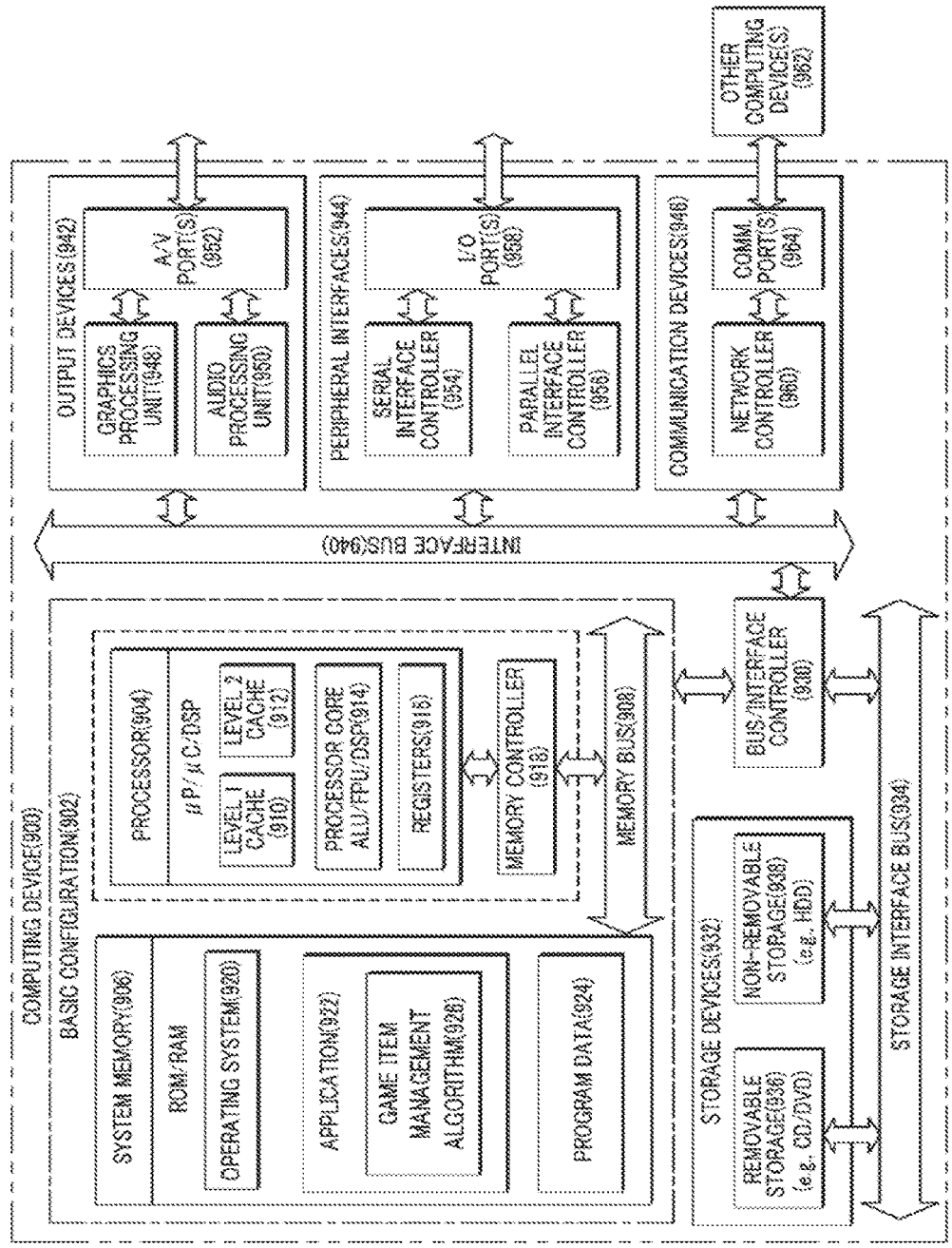
FIG. 9 is a block diagram illustrating an example computing device that may be utilized to implement a game item management scheme, arranged in accordance with at least some embodiments described herein.

FIG. 9 is a block diagram illustrating an example computing device 900 that may be utilized to implement a game item management scheme, arranged in accordance with at least some embodiments described herein.

In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924.

Application 922 may include a game item management algorithm 926 that may be arranged to perform the functions as described herein including the actions described with respect to game server 120 architecture as shown in FIGS. 2-4 or including the actions described with respect to the flow chart shown in FIG. 7. Program data 924 may include any data that may be useful for providing the game item management scheme as is described herein. In some examples, application 922 may be arranged to operate with program data 924 on an operating system 920 such that the game item management scheme as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a game server, the method comprising:
   receiving, by the game server, from a player account, a request to play a game hosted on the game server, wherein the player account is accessible by a player, over a wireless network and by using an electronic device, to play the game;
   determining, by the game server, whether the player account has been dormant based, at least in part, on an amount of elapsed time between a most recent playing of the game by the player and the receipt of the request, wherein the determination provides a stimulus for at least one game item, associated with the player account, to be upgraded;
   upgrading, by the game server, the at least one game item associated with the player account, in response to the determination that the player account has been dormant; and
   providing, by the game server, the upgraded at least one game item to the player account, thereby enabling the player to play the game with the upgraded at least one game item.

2. The method of claim 1, wherein the determining includes:
   comparing the amount of elapsed time with a threshold time period; and
   determining that the player account has been dormant when the amount of elapsed time is longer than the threshold time period.

3. The method of claim 1, wherein the determining is further based, at least in part, on an amount of elapsed time between a release of a last patch related to the game and the receipt of the request.

4. The method of claim 1, wherein the upgrading includes selecting the at least one game item to be upgraded from among a plurality of game items previously associated with the player account.

5. The method of claim 1, wherein the upgrading includes replacing the at least one game item with another game item.

6. The method of claim 5, wherein the replacing is based, at least in part, on usage information of other players.

7. The method of claim 5, wherein the replacing is based, at least in part, on transaction information of other players.

8. The method of claim 1, wherein the upgrading includes upgrading performance capabilities of the at least one game item.

9. The method of claim 8, wherein the upgrading is based, at least in part, on an average growth rate of the performance capabilities of the at least one game item during the amount of elapsed time.

10. The method of claim 1, wherein the upgrading is based, at least in part, on the amount of elapsed time.

11. A game server, comprising:
    a play request receiver unit configured to receive, from a player account, a request to play a game hosted on the game server, wherein the player account is accessible by a player, over a wireless network and by use of an electronic device, to play the game;
    a dormancy determination unit configured to determine whether the player account has been dormant based, at least in part, on an amount of elapsed time between a most recent playing of the game by the player and the receipt of the request to play the game, wherein the determination provides a stimulus for at least one game item, associated with the player account, to be upgraded;
    a game item modification unit configured to upgrade the at least one game item associated with the player account after the dormancy determination unit determines that the player account has been dormant; and
    a storage configured to store the upgraded at least one game item to the player account so as to enable the player to play the game with the upgraded at least one game item.

12. The game server of claim 11, wherein the dormancy determination unit is configured to:
    compare the amount of elapsed time with a threshold time period; and
    determine that the player account has been dormant when the amount of elapsed time is longer than the threshold time period.

13. The game server of claim 11, wherein:
    the game item modification unit is configured to upgrade the at least one game item based, at least in part, on a look-up table hosted on the game server, and
    the look-up table is configured to indicate how to upgrade a plurality of game items associated with the game in accordance with the determination by the dormancy determination unit.

14. The game server of claim 13, wherein the look-up table is configured to indicate how to upgrade each of the plurality of game items based, at least in part, on at least one threshold time period.

15. The game server of claim 13, wherein the look-up table is further configured to identify a replacement game item for at least one of the plurality of game items.

16. The game server of claim 15, wherein the look-up table is configured to identify the replacement game item based on at least one of usage information of other players or transaction information of the other players.

17. The game server of claim 13, wherein the look-up table is configured to indicate upgrade of performance capabilities of the at least one game item.

18. The game server of claim 17, wherein the look-up table is configured to upgrade based, at least in part, on an average growth rate of the performance capabilities of the at least one game item during at least one threshold time period.

19. A non-transitory computer-readable storage medium that includes computer-executable instructions stored thereon which, in response to execution by a processor, cause the processor to perform or control performance of operations that comprise:
    identify a request, from a player account, to play a game hosted on a game server, wherein the player account is accessible by a player, over a wireless network and by use of an electronic device, to play the game;
    compare an amount of elapsed time between a most recent playing of the game by the player and the identification of the request to play the game with a threshold time period;
    determine that the player account has been dormant when the amount of elapsed time is longer than the threshold time period, wherein the determination provides a stimulus for at least one game item, associated with the player account, to be modified;

modify the at least one game item associated with the player account, wherein the at least one game item is modified in a first manner when the player account has been dormant for a first period of time and in a second manner when the player account has been dormant for a second period of time, wherein the second manner is different from the first manner, and wherein the second period of time is greater than the first period of time; and provide the modified at least one game item to the player account to enable the player to play the game with the modified at least one game item.

20. The non-transitory computer-readable storage medium of claim 19, wherein the modification includes at least one of:

replacement of the at least one game item with another game item based on at least one of usage information of other players or transaction information of the other players, or an upgrade of performance capabilities of the at least one game item based, at least in part, on an average growth rate of the performance capabilities of the at least one game item during at least one threshold time period.

* * * * *